(12) United States Patent
Gibard

(10) Patent No.: US 11,959,782 B2
(45) Date of Patent: Apr. 16, 2024

(54) REFLECTIVE COATING FOR REFLECTION MEANS OF AN OPTICAL ENCODER AND OPTICAL ENCODER THUS PRODUCED

(71) Applicant: CODECHAMP, Champagnat (FR)

(72) Inventor: Dominique Gibard, Bellegarde en Marche (FR)

( * ) Notice: Subject to any disclaimer, the term of this patent is extended or adjusted under 35 U.S.C. 154(b) by 0 days.

(21) Appl. No.: 18/009,782

(22) PCT Filed: Jun. 18, 2021

(86) PCT No.: PCT/IB2021/055409
§ 371 (c)(1),
(2) Date: Dec. 12, 2022

(87) PCT Pub. No.: WO2022/003473
PCT Pub. Date: Jan. 6, 2022

(65) Prior Publication Data
US 2023/0314186 A1 Oct. 5, 2023

(30) Foreign Application Priority Data
Jun. 30, 2020 (FR) ........................................ 2006885

(51) Int. Cl.
*G01D 5/347* (2006.01)

(52) U.S. Cl.
CPC ....... *G01D 5/34723* (2013.01); *G01D 5/3473* (2013.01)

(58) Field of Classification Search
CPC .. G02B 5/0875; G02B 5/0866; G02B 5/0858; G02B 5/085; G02B 5/0841; G02B 5/0833; G02B 5/0825; G02B 5/0816; G02B 5/08; G02B 5/0808; G01D 5/3473; G01D 5/34746; G01D 5/34723; G01D 5/34715; G01D 5/34707; G01D 5/347; G01D 5/34
See application file for complete search history.

(56) References Cited

U.S. PATENT DOCUMENTS

| | | | | |
|---|---|---|---|---|
| 4,998,239 A * | 3/1991 | Strandjord | ............ | G11B 7/263 |
| 5,451,776 A * | 9/1995 | Kolloff | ............... | G01D 5/2497 250/231.14 |
| 10,634,522 B2 * | 4/2020 | Wada | ..................... | G01D 5/345 |
| 11,156,481 B2 * | 10/2021 | Naor | ..................... | G11B 7/083 |
| 2004/0233530 A1 * | 11/2004 | Kramer | ............ | H01L 31/02327 359/507 |
| 2008/0316493 A1 * | 12/2008 | Maeda | ................. | G02B 5/1857 356/445 |
| 2013/0221212 A1 * | 8/2013 | Soo | ..................... | G01D 5/34707 324/207.11 |
| 2016/0370568 A1 * | 12/2016 | Toussaint | ............... | C03C 17/36 |
| 2023/0126475 A1 * | 4/2023 | Nakazawa | ........... | G01D 5/3473 250/216 |

* cited by examiner

*Primary Examiner* — John R Lee

(57) ABSTRACT

A reflective coating belongs to a reflection structure for reflecting a light beam emitted by a light source of an optical encoder, the reflection of the light beam being directed toward a photoreceptor. The reflective coating includes at least one flat lamella made of glass, a first face of which forms a connection surface on one portion of the reflection structure of the optical encoder. A second face of the lamella opposite the first face forms another connection surface to connect with at least one layer made of at least one material having a reflection coefficient greater than 96% coated with a protective layer.

7 Claims, 2 Drawing Sheets

REFLECTIVE COATING FOR REFLECTION MEANS OF AN OPTICAL ENCODER AND OPTICAL ENCODER THUS PRODUCED

The present invention relates to a reflective coating of the reflection means of an optical encoder as well as the optical encoder thus produced.

DESCRIPTION OF THE RELATED ART

An optical encoder, in particular a so-called high-resolution optical encoder, is a device for determining the angular position of one moving object relative to another. To this end, according to a type of optical encoder described in EP-B-964 226, an optical beam is emitted in the direction of reflective means ensuring the deflection of the light beam toward means for receiving the beam. A rotating disc whose angular position is to be determined is placed between the means for transmitting and receiving the beam and the means reflecting the light beam. The disc comprises tracks defined by opaque areas and translucent areas, characteristic of each disc. It also comprises diffraction means formed by a reticle. Openings form the reflective means for diffraction of the light beam between the transmitting and receiving means. These openings comprise at least two surfaces disposed angularly with respect to the plane in which the means for transmitting and receiving the light beam are located. The light beam successively passes over the two surfaces between transmission and reception, the optical path of the beam also crossing the rotating disc at least once and the reticle providing diffraction at least once.

Here, the reflective surfaces are disposed angularly, for example at 45°. While such an encoder allows the angular position of a rotating object to be measured in a reduced space, it is essential to ensure optimum reflection of the light beam between the surfaces. In other words, the reflection coefficient between the surfaces, for the wavelength concerned, must not be modified over time, knowing that the reflection coefficient must be as high as possible in order to avoid any loss of light during the path of the optical beam. However, here, according to one embodiment, the reflective surfaces are obtained by machining openings of given shapes in a block of material and by polishing the surfaces. Alternatively, prisms are positioned in the openings and define the angularly disposed reflective surfaces. Known from US-A-2013/221212 is a reflection surface integrated into the body of the sensor. The surface is formed by a layer of corrosion-resistant noble metal such as gold fixed on a layer of another metal, so that the assembly does not protrude from the surface of the sensor. EP-A-2006712 describes a reflection surface of an optical encoder based on chromium and titanium silicide as gold adhesion material to produce a coating with asperities allowing the phase change of the reflection on the coating.

It is therefore not easy with the reflective surfaces of the state of the art to obtain a minimum loss of reflection, lasting over time, while preserving easy manufacture at a controlled cost.

BRIEF SUMMARY OF THE INVENTION

It is this need that the invention proposes to remedy by proposing a coating of the reflective surfaces of an optical sensor ensuring a high and durable reflection coefficient over time and easy implementation, without modifying the initial size of the sensor, at a controlled cost.

To this end, the subject of the invention is a reflective coating for means for reflecting a light beam emitted by a light source of an optical encoder, the reflection of the light beam being directed toward a photoreceptor, characterized in that the coating comprises at least one flat lamella made of glass, one face of which forms a connection means on one portion of the reflection means of said optical encoder, said lamella being provided, on the face opposite the face forming a connection means, with at least one layer made of at least one material having a reflection coefficient greater than 96% for the wavelengths of the light beam to be reflected, said material having a reflection coefficient greater than 96% being gold or an alloy based on gold, and in that it comprises a layer of protective material for protecting the layer of gold.

A reflective coating is thus obtained that incorporates the connection means on the reflection means of the optical encoder. The use of a glass lamella, in addition to not substantially modifying the size of the reflection means, facilitates the handling and placement of the coating. Since the reflective material is present from the start on the glass lamella, once this lamella has been fixed on the reflection means, the reflective material is directly operational, the protective layer making it possible to maintain the initial reflection value over time. In addition, a glass lamella makes it possible to obtain a perfectly flat surface on which it is possible to deposit a uniform layer, having a controlled thickness of reflective material.

According to advantageous but optional aspects of the invention, such a reflective coating may comprise one or more of the following features:

- the glass face opposite the face forming a connection means receives a layer of a material having physico-chemical characteristics such that it adheres, on the one hand, to said glass face and such that it adheres, on the other hand, to another material or to a mixture or alloy of materials having a reflection coefficient greater than 96% for the wavelengths of the light beam to be reflected.
- The material providing the connection between the face and the reflective material is chromium or a chromium alloy.
- The material with a reflection coefficient greater than 96% is silver or a silver-based alloy.
- The glass lamella and the layers of materials are fixed on a support formed by a sheet of polymers.
- The glass lamella and the layers of materials are pre-cut on the sheet to the desired dimensions corresponding to those of the reflective coating.

The invention also relates to an optical encoder equipped with at least one reflection means conforming to one of the preceding features.

BRIEF DESCRIPTION OF THE SEVERAL VIEWS OF THE DRAWINGS

The invention will be better understood, and further advantages thereof will become more clearly apparent, from reading the following description, which is provided solely by way of a non-limiting example and refers to the accompanying drawings, in which.

DETAILED DESCRIPTION OF THE INVENTION

Figure 1:
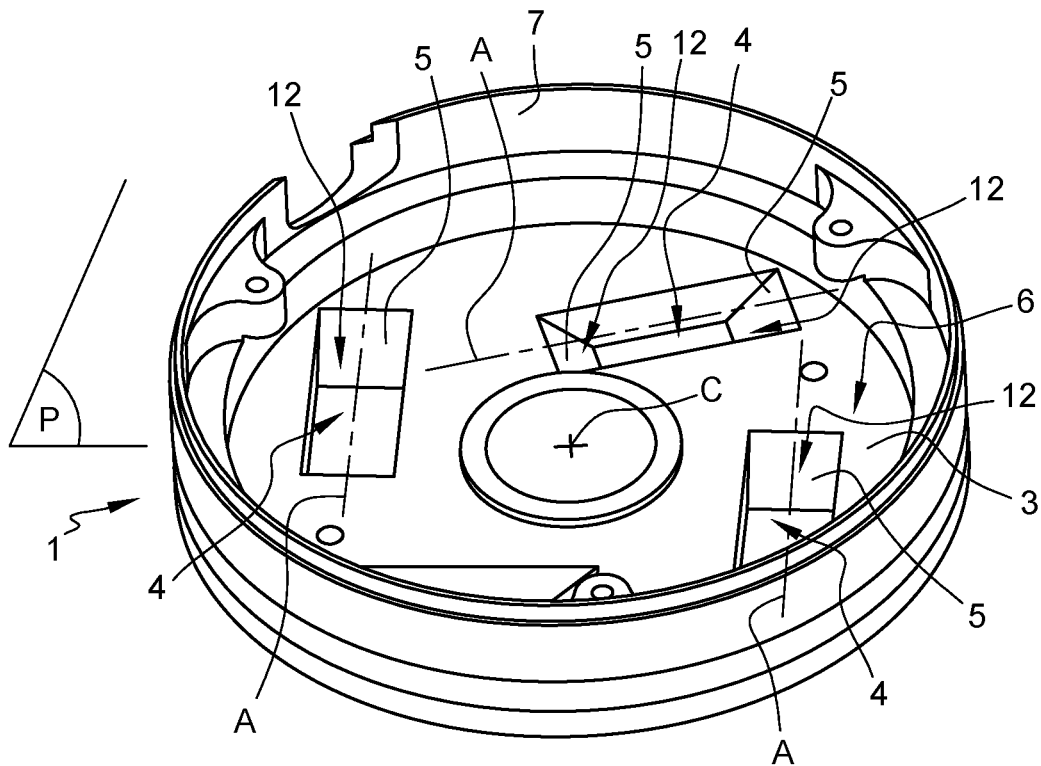
FIG. 1 illustrates a perspective view of the portion of an optical encoder comprising reflection means according to one embodiment of the invention.
Figure 2:
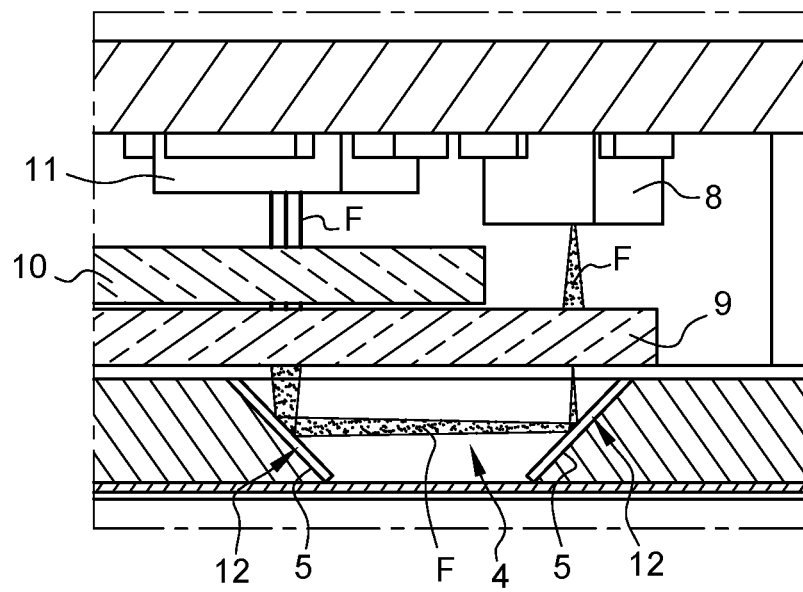
FIG. 2 is a diagram, on another scale, illustrating the operating principle of an optical encoder according to one embodiment of the invention.

FIG. 1 illustrates a portion of an optical encoder, referenced 1, that corresponds to the part of the optical encoder receiving the reflection means, referenced 2. The portion 1 is configured as a circular volume open at the top looking at FIG. 1. This upper opening makes it possible to receive the other constituent elements of an optical encoder, as schematically illustrated in FIG. 2. The bottom 3 of the portion 1 is flat and, in the example, equipped with three rectangular through-cutouts 4. As a variant, the number of cutouts is different from three. The walls 5 of these cutouts 4 corresponding to the short sides of the rectangular cutouts 4 are inclined at 45° with respect to the main plane P of the bottom 3. The inclination of the walls 5 is oriented so that the opening of the angle defined by the walls 5 is located on the inner face 6 of the bottom 3, therefore the face oriented in the direction of the other constituent elements of the optical encoder when the latter are in place above the portion 1.

As can be seen from FIG. 1, in this type of optical encoder, the main longitudinal axes A of the cutouts 4 are oriented angularly relative to one another. These cutouts 4 are distributed over the bottom 3, between the center C of the bottom 3 and the peripheral wall 7 limiting the bottom 3. Thus, the cutouts 4 and the inclined walls 5 define the reflection means 2. As a variant that is not shown, the number, arrangement, shape and dimensions of the cutouts 4 are different.

FIG. 2 schematically shows the operation of such an optical encoder and, in particular, the role of the reflection means 2. A light-emitting diode 8 emits, advantageously in the infrared, a light beam F that passes through a glass reticle 9 before striking one of the walls 5, which deflects it and sends it back onto the other wall 5 of a cutout 4 in a direction parallel to the plane P of the bottom 3 due to the 45° inclination. The beam F passes back through the glass reticle 9 and through a glass disc 10 before striking photoreceptors 11. The disc 10 is rotatable, with opaque areas and translucent areas. The glass reticle 9 ensures the diffraction of the beam F. A detailed operation of this type of optical encoder is, for example, provided by EP-B-964 226.

FIG. 2 illustrates the role of the walls 5 that provide the reflection in defined directions of the optical beam F. Such a globally U-shaped path of the beam F makes it possible to position the transmitter 8 and the receiver 11 of the light beam F in the optical encoder on the same plane, which allows the total size of the encoder to be reduced, in particular in terms of thickness.

It is noted that the reflection of the beam F between the walls 5 must be done, in a constant manner, without any optical loss and precisely respecting the parallelism of the optical paths of the beam F between the transmitter 8 and one wall 5 and between the other wall 5 and the receiver 11, so as to guarantee the accuracy of the measurement. The characteristics of the reflection must be constant over time, without alteration or modification, regardless of the number of measurements carried out and the environmental conditions such as, for example, thermal variations, vibrations and impacts, over the entire lifetime of an optical encoder, knowing that this lifetime is at least 20 years.

Each wall 5 is thus provided with a reflective coating 12. This coating 12 is particularly visible in FIG. 3. According to the invention, the coating 12 comprises a flat glass lamella 13. Such a lamella 13 has a thickness of between 0.15 mm and 0.25 mm, advantageously close to 0.2 mm. Insofar as the inclined planes are machined with an optimal angle to achieve the path of the light beam, the coating must have a minimal impact on the initial reflection, therefore a minimum thickness in order to limit the optical reflection imperfections, while being sufficiently strong and rigid. Therefore, a thickness of the glass lamella close to 0.2 mm is retained. A lower face 14, looking at FIG. 3, of the lamella 13 is adapted to be fixed on a wall 5. Fixing is done by gluing, advantageously with an adhesive that can be polymerized under ultraviolet rays. Such adhesive must be fluid to be used in a thin layer so as not to affect the total thickness of the coating. This adhesive must withstand impacts, vibrations, high temperature variations, for example from −40° C. to +150° C., be durable over time given the lifetime of an encoder, which is at least 20 years, and be flexible enough to withstand the different thermal expansions between the glass of the lamella and the metal of the inclined wall. Furthermore, the polymerization of the adhesive must be almost immediate, typically of the order of 15 s once the lamella is in position and the user wishes to carry out the bonding. Such an adhesive is, for example, an adhesive based on transparent acrylic marketed by the company PANACOL. As a variant, another adhesive is used, for example an adhesive that is heat-polymerizable at ambient temperatures, generally between 20° C. and 25° C.

Figure 3:
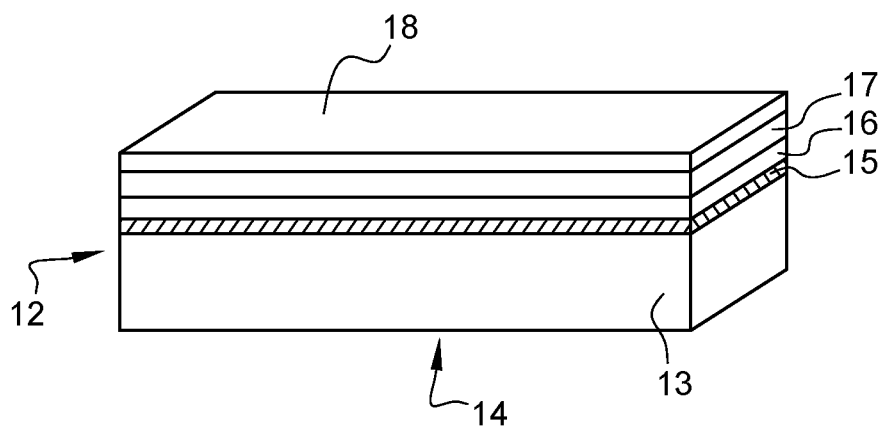
FIG. 3 is a simplified perspective view, on a larger scale, of a coating of a reflection means of FIG. 1.

The face 15, opposite the face 14, is schematically shown in FIG. 3 by cross-hatching for greater readability. The face 15 receives a layer of a material 16 having physicochemical characteristics such that it adheres, on the one hand, perfectly to the glass and such that it adheres, on the other hand, to another material or to a mixture or alloy of materials having a reflection coefficient greater than 96% for the wavelengths concerned, namely in this case wavelengths between 800 nm and 900 nm. Here, the material 16 is chromium. As a variant, it is a material or an alloy of materials that makes it possible to adhere to glass and also exhibits adhesion to gold.

It is understood that the material 16, therefore here the chromium, is chosen not only as having optimum adhesion to glass but also as a function of the material 17 selected for its high reflection coefficient. Here, the material 17 is 99.99% pure gold, whose reflection coefficient at 850 nm is 97.8%.

The chromium layer 16 is fixed on the face 15 by techniques known per se, for example by evaporation deposition. Such a technique makes it possible to produce a layer of chromium 16 comprised between 0.05 micron and 0.1 micron.

The gold layer 17 is also deposited using this technique and it also has a thickness of between 0.05 micron and 0.1 micron. In other words, the cumulative thicknesses of the lamella 13 and the layers of chromium 16 and gold 17 are of the order of 0.2 mm, which does not substantially modify the thickness of the walls 5 and therefore the path of the beam F.

Gold is chosen to produce the layer of reflective material 17 because, in addition to a high reflection coefficient, namely greater than 96% for wavelengths between 800 nm and 900 nm, therefore in the infrared, this metal is inert, almost insensitive to corrosion, completely non-magnetic, ductile, malleable and easily polishable. It is used to obtain a flat, reflective, regular, homogeneous surface while preserving the initial flatness, close to mirror polish, of glass. Since gold is a malleable and soft metal at ambient temperature, a layer 17 of gold is all the more sensitive to marking and impacts the thinner it is. Over time, there is also a slippage phenomenon. Advantageously, the layer 17 of gold is coated with a layer of protective material 18. Indeed, any marking of the surface of the layer 17 and any oxidation or patina effect of the gold layer 17 should be avoided. In the absence of a protective layer 18, a degradation of the reflection is observed over time, due to the tarnishing of the layer by patina and/or oxidation phenomena. Since maintaining the reflection coefficient over time is an important point for the reliability of the encoder, the presence of a protective layer 18 making it possible to maintain a constant reflection coefficient over a period of at least 20 years is necessary. It is therefore advantageous to deposit a layer 18 of a protective material thereon. This material must be totally transparent and optically neutral so as not to affect the path of the beam, either by deflecting the latter and/or by absorbing a portion of it. Alumina meets these requirements. To this end, a layer of alumina is deposited on the layer 17 with a thickness close to 0.015 mm. Such a thickness of the protective layer 18 provides optimal protection without affecting the nominal thickness of the coating. As a variant, it is another material or a composite material, for example silica, that can be used to protect, for example, other deposits of a material other than gold, for example deposits based on silver.

The dimensions of the coating 12, therefore of the glass lamella 13 coated with the chromium layer 16, the gold layer 17 and the protective layer 18 are generally between 2.5 mm and 3 mm wide for 2.5 mm to 3 mm long with a thickness of less than 0.3 mm.

Figure 4:
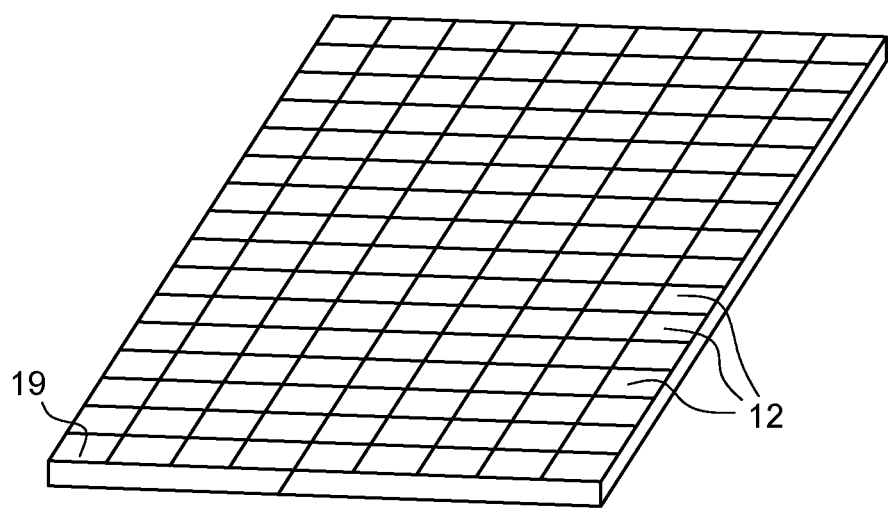
FIG. 4 is a simplified perspective view, on another scale, of the method of providing a coating assembly as shown in FIG. 3.

It is therefore conceivable that the handling, transport and storage of such coatings 12 are not easy. Consequently, as shown in FIG. 4, the coatings 12 are made prior to the implementation of the invention by precutting in a sheet 19 that defines a means for storage and transport of the coatings 12. This sheet 19 is obtained from a sheet of polymers on which the various layers 13, 16 to 18 constituting the coating 12 are deposited by techniques known per se, such as evaporation deposition. Each coating 12 is then precut to the desired dimensions by sawing. Here, the precut coatings 12 are disposed in parallel rows. Each coating 12 being adjacent to another coating 12, the separation between two coatings 12 being embodied by a cutting line, in order to be able to take a coating 12 individually without risk of damaging an adjacent coating 12, as illustrated in FIG. 4. Alternatively, the arrangement of the coatings 12 on the sheet 19 is different. Such sheets 19 are made beforehand, by techniques known per se from specialized suppliers.

It is then easy to take the precut coatings 12 on the sheet 19 and to position them on the walls 5. As indicated above, the fixing is done by gluing, advantageously with UV polymerization of the adhesive. As a variant, another type of adhesive is used, for example an adhesive that can be polymerized at room temperature, in the presence or absence of an activator.

The coating 12 is positioned on the wall 5, during the step of fixing by gluing, so that it covers the entire surface of the wall 5. Thus, when the beam F strikes the reflective layer 17, even if the beam F is not perfectly in the center of the reflective layer 17, this does not affect the optical path of the beam F in the direction of the other wall 5.

In other embodiments of the invention, the reflective coating having a reflection coefficient of at least 96% at the wavelengths considered is obtained by machining, polishing the material constituting the walls 5. In such a case, said walls 5 are, for example, made of another metal or metal alloy or material having similar optical properties. The material having a reflection coefficient greater than 96% is gold or a gold alloy of expansion similar to that of glass.

The invention claimed is:

1. A reflective coating of a reflection means for reflecting a light beam emitted by a light source of an optical encoder, the reflection of the light beam being directed toward a photoreceptor, the reflective coating comprising:
at least one flat lamella made of glass, a first face of which forms a connection means to one portion of the reflection means of said optical encoder, and a second face, opposite the first face, of which forms a connection means with at least one layer made of at least one material having a reflection coefficient greater than 96% for wavelengths of the light beam to be reflected, said at least one material having a reflection coefficient greater than 96%, being gold or an alloy based on gold, and said at least one layer further comprising a layer of protective material for protecting the layer of gold or alloy based on gold, wherein the layer of protective material is totally transparent, optically neutral, and maintains a constant reflection coefficient over a period of at least 20 years and without affecting a nominal thickness of the coating.

2. The coating according to claim 1, wherein the second face receives a layer of connection material having physicochemical characteristics such that it adheres; to both said second face and to said at least one material having the reflection coefficient greater than 96% for the wavelengths of the light beam to be reflected.

3. The coating according to claim 2, wherein the connection material is chromium or a chromium alloy.

4. The coating according to claim 2, wherein the glass lamella, the least one layer made of at least one material having the reflection coefficient greater than 96% for the wavelengths of the light beam to be reflected, and the layer of connection material are fixed on a support formed by a sheet of polymers.

5. An optical encoder equipped with at least one reflection means according to claim 1.

6. The coating according to claim 1, wherein the layer of protective material is made of a layer of alumina.

7. The coating according to claim 6, wherein the thickness of the layer of alumina is 0.015 mm.

* * * * *